United States Patent
Tano et al.

(10) Patent No.: US 8,784,644 B2
(45) Date of Patent: Jul. 22, 2014

(54) STOCK OIL COMPOSITION FOR CARBONACEOUS MATERIAL FOR NEGATIVE ELECTRODE OF LITHIUM-ION SECONDARY BATTERY

(71) Applicants: Tamotsu Tano, Yamaguchi (KH); Takashi Oyama, Yamaguchi (JP); Hiroshi Ozawa, Yamaguchi (JP); Jun Ougiya, Yamaguchi (JP); Akio Sakamoto, Tokyo (JP)

(72) Inventors: Tamotsu Tano, Yamaguchi (KH); Takashi Oyama, Yamaguchi (JP); Hiroshi Ozawa, Yamaguchi (JP); Jun Ougiya, Yamaguchi (JP); Akio Sakamoto, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 13/727,815

(22) Filed: Dec. 27, 2012

(65) Prior Publication Data
US 2013/0115518 A1 May 9, 2013

Related U.S. Application Data

(63) Continuation of application No. PCT/JP2011/064962, filed on Jun. 29, 2011.

(30) Foreign Application Priority Data

Jun. 30, 2010 (JP) ................................. 2010-150166

(51) Int. Cl.
*C10G 11/00* (2006.01)
*H01M 4/133* (2010.01)

(52) U.S. Cl.
USPC ............. 208/39; 208/22; 423/488; 429/231.8

(58) Field of Classification Search
USPC ............. 429/231.8; 208/39, 22, 106; 423/488
See application file for complete search history.

(56) References Cited

U.S. PATENT DOCUMENTS

| 2007/0009418 | A1 | 1/2007 | Kobayashi et al. | |
|---|---|---|---|---|
| 2008/0210600 | A1* | 9/2008 | O'Connor et al. | 208/113 |
| 2010/0276631 | A1* | 11/2010 | Mabuchi et al. | 252/182.1 |

FOREIGN PATENT DOCUMENTS

| JP | 4-24831 | | 1/1992 |
|---|---|---|---|
| JP | 3056519 | | 4/2000 |
| JP | 2009-117257 | | 5/2009 |
| JP | 2011-65961 | | 3/2011 |
| WO | WO 2005/027242 | A1 | 3/2005 |
| WO | WO 2009072381 | A1 * | 6/2009 |

OTHER PUBLICATIONS

Nesumi et al. Properties of Fluid Catalytic Cracking Decant Oils of Different Origins in Their Single Carbonization and Cocarbonization with a Petroleum Vacuum Residue. Ind. Eng. Chem. Res., vol. 29, 1990, pp. 1793-1801 [online], [retrieved on Feb. 18, 2014]. Retrieved from the Internet <URL: http://pubs.acs.org/doi/abs/10.1021/ie00105a009>.*

I. Kuniaki et al., "Nonaqueous Solvent Secondary Battery", English-language abstract of JP 4-206365, published Jul. 28, 1992.

International Search Report issued Sep. 27, 2011, in corresponding international application No. PCT/JP2011/064962.

International Preliminary Report on Patentability (Chapter 1 of the Patent Cooperation Treaty) issued by WIPO for the corresponding PCT application, International Application No. PCT/JP2011/064962, mailed Jan. 17, 2013.

* cited by examiner

*Primary Examiner* — Jonathan G Leong
*Assistant Examiner* — James Erwin
(74) *Attorney, Agent, or Firm* — Finnegan, Henderson, Farabow, Garrett & Dunner, L.L.P.

(57) ABSTRACT

Provided is a stock oil composition for a carbonaceous material for a negative electrode of a lithium-ion secondary battery which composition is useful for achieving excellent high-speed charge and discharge characteristics. The stock oil composition for a carbonaceous material for a negative electrode of a lithium-ion secondary battery uses a bottom oil of residue fluid catalytic cracking apparatus as a raw material. The stock oil composition comprises, of a saturated component, an aromatic component, a resin component and an asphaltene component detectable by development of the stock oil composition using thin-layer chromatography, the saturated component ranging from 30 to 50% by weight and the aromatic component ranging from 50 to 70% by weight; and has an average molecular weight of from 400 to 600.

5 Claims, No Drawings

STOCK OIL COMPOSITION FOR CARBONACEOUS MATERIAL FOR NEGATIVE ELECTRODE OF LITHIUM-ION SECONDARY BATTERY

This application is a continuation of PCT/JP2011/064962, filed on Jun. 29, 2011.

BACKGROUND OF THE INVENTION

1. Field of the Invention

The present invention relates to a stock oil composition for preparing a carbonaceous material for a negative electrode of a lithium-ion secondary battery capable of achieving high charge and discharge capacity.

2. Description of the Related Art

A lithium-ion secondary battery has lighter weight and more excellent input and output characteristics than a conventional secondary battery such as a nickel cadmium battery, a nickel hydrogen battery and a lead battery, and has therefore been considered promising in recent years as a power source for an electric vehicle and a hybrid vehicle. A carbonaceous material is used as an active material constituting an electrode of a lithium-ion secondary battery and has been extensively studied with the aim of increasing the performance of a lithium-ion secondary battery (refer to, for example, Japanese Patent No. 3056519 and Japanese Patent Application Examined Publication (JP-B) No. 4-24831/1992).

The carbonaceous material used as a negative electrode material of a lithium-ion secondary battery is, in general, roughly classified into a graphite-based carbonaceous material and an amorphous carbonaceous material. The graphite-based carbonaceous material has an advantage of higher energy density per unit volume compared with the amorphous carbonaceous material. For this reason, the graphite-based carbonaceous material is usually employed as a negative electrode material in a lithium-ion secondary battery for a cellular phone and a laptop computer which are compact but require large charge and discharge capacity. Graphite has a structure in which hexagonal network planes of carbon atoms have been stacked regularly, and during charging and discharging, intercalation or deintercalation of lithium ions takes place at the edges of the hexagonal network planes.

SUMMARY OF THE INVENTION

Use of a graphite-based carbonaceous material as the negative electrode material of the lithium-ion secondary battery results in an increase in energy density per unit volume as described above. However, when such a carbonaceous material is used in a field of automobile such as a hybrid vehicle, there is room for improvement in high-speed charge and discharge characteristics, particularly high-speed charge characteristics. This problem is presumed to be caused mainly by high crystallinity of the graphite-based carbonaceous material which limits the diffusion of solvated lithium ions in the carbon layer when it is used for the negative electrode of the lithium-ion secondary battery.

With the foregoing in view, the invention has been made. An object of the invention is to provide a stock oil composition for a carbonaceous material for a negative electrode of a lithium-ion secondary battery, which composition is useful for achieving excellent charge and discharge characteristics of the lithium-ion secondary battery.

In order to produce a lithium-ion secondary battery having large charge and discharge capacity and excellent high-speed charge and discharge characteristics, it is necessary to use, as a negative electrode material, a carbonaceous material having a highly developed crystal structure and form diffusion paths of solvated lithium ions in such a manner that a number of diffusion paths are arranged in the carbon layer. In other words, growth of a carbon layer plane and formation of a larger number of well-ordered edge planes of carbon are necessary.

The present inventors have investigated a carbonaceous material having an excellent crystal structure, while paying attention to the formation mechanism of the crystal structure. For example, needle coke is formed through the following steps; a heavy oil is treated at high temperature to cause thermal cracking and polymerization and/or condensation reaction and thereby form liquid crystal spherules called "mesophase"; and then, as a result of coalescence of these spherules, large liquid crystal called "bulk mesophase" is formed as an intermediate product. The present inventors made an extensive investigation on the influence of a stock oil composition and a raw material carbon composition to be used for the preparation of carbonaceous materials on the crystal structure.

As a result of investigation, the inventors have found that in order to obtain a lithium-ion secondary battery capable of satisfying the above-mentioned required performance, it is effective to use a stock oil composition comprising an adequate amount of an aromatic component which is a fraction forming a good bulk mesophase but not forming an isotropic component as called "Non-Mesogen" which does not become a mesophase during a coking process; and an adequate amount of a saturated component capable of forming a gas contributing to formation of diffusion paths of lithium ions in the carbon layer when this bulk mesophase is carbonized and solidified by polymerization and/or condensation.

Although fluid catalytic cracking (FCC) has been thought to be inappropriate for residual oil treatment because of deterioration of the catalyst and difficulty in control of operation temperature, the inventors have surprisingly found as a result of intensive investigation that a bottom oil of residue fluid catalytic cracking (RFCC) apparatus is suited as the raw material of the above-mentioned stock oil composition.

In one aspect of the invention, there is provided a stock oil composition for a carbonaceous material for a negative electrode of a lithium-ion secondary battery, the composition comprising a bottom oil of residue fluid catalytic cracking apparatus as a raw material, wherein the stock oil composition comprises, of a saturated component, an aromatic component, a resin component and an asphaltene component detectable by development of the stock oil composition by using thin-layer chromatography, the saturated component ranging from 30 to 50% by weight and the aromatic component ranging from 50 to 70% by weight; and has an average molecular weight ranging from 400 to 600.

In another aspect of the invention, there is also provided a raw material carbon composition for a carbonaceous material for a negative electrode of a lithium-ion secondary battery, the raw material carbon composition being obtained by the heat treatment of this stock oil composition. In a further aspect of the invention, there is also provided a method of preparing a carbonaceous material for a negative electrode of a lithium-ion secondary battery, comprising the steps of: pulverizing the raw material carbon composition into a raw material carbon composition powder having an average particle size not greater than 30 μm; and carbonizing and/or graphitizing the raw material carbon composition powder thus obtained.

In a still further aspect of the invention, there is also provided a lithium-ion secondary battery comprising a negative electrode material comprising the carbonaceous material obtained by the above method.

A lithium-ion secondary battery comprising a negative electrode comprising the carbonaceous material produced from the stock oil composition with the above-mentioned feature can achieve excellent high-speed charge and discharge characteristics. This is presumed to occur mainly because in the thermal cracking and polymerization and/or condensation reaction during the coking procedure of the stock oil composition, good-quality mesophase is formed and an adequate amount of a gas is generated at the time of bulk mesophase formation and solidification so that diffusion paths of lithium ions develop sufficiently in the carbon layer.

The invention provides a stock oil composition for the negative electrode material of the lithium-ion secondary battery capable of realizing the lithium-ion secondary battery having excellent high-speed charge and discharge characteristics by using a bottom oil of residue fluid catalytic cracking apparatus as a raw material and appropriately regulating the formation of the starting stock oil composition.

Particularly in the invention, the stock oil composition can be optimized as the negative electrode material for the lithium-ion secondary battery by appropriately regulating the composition of the stock oil at a starting stage. Thus, regulation of the composition can be done easily.

DESCRIPTION OF THE PREFERRED EMBODIMENTS

It should be noted that the entire contents of Japanese Patent Application No. 2010-150166, filed on Jun. 30, 2010, on which the convention priority is claimed is incorporated herein by reference.

It should also be understood that many modifications and variations of the described embodiments of the invention will occur to a person having an ordinary skill in the art without departing from the spirit and scope of the present invention as claimed in the appended claims.

The present invention will hereinafter be described in detail.

The composition ratio of the individual components of the stock oil composition is determined using the TLC-FID method. In the TLC-FID method, a sample is separated into four components, that is, a saturated component, an aromatic component, a resin component and an asphaltene component by using thin-layer chromatography (TLC); each component is then detected using a flame ionization detector (FID); and the percentage of the amount of each component to the total amount of all the components is defined as the composition ratio of each component.

First, 0.2 g±0.01 g of the sample is dissolved in 10 ml of toluene to prepare a sample solution. The lower end (the position of 0.5 cm for the rod holder) of a silica gel thin-layer rod (chromarod) baked beforehand is spotted with 1 µl of the solution by using a micro syringe, followed by drying with a dryer or the like. Then, with ten chromarods as a set, the sample is developed using developing solvents. As the developing solvents, hexane in a first development chamber, hexane/toluene (20:80 by volume) in a second development chamber, and dichloromethane/methanol (95:5 by volume) in a third development chamber are used. The saturated component is eluted and developed in the first development chamber using hexane as the solvent. The aromatic component is eluted and developed in the second development chamber using hexane/toluene as the solvent after the first development. The chromarods after development are loaded in a measuring instrument (for example, "IATROSCAN MK-5", trade name; product of Dia-Iatron (current Mitsubishi Kagaku Iatron, Inc.)) to measure the amount of each component. Amounts of all the components are added to obtain the total amount of all the components.

According to the invention, the stock oil composition comprises, based on the total content (100% by weight) of a saturated component, an aromatic component, a resin component and an asphaltene component detectable by development of the stock oil composition by using a thin-layer chromatography, the saturated component of from 30 to 50% by weight, preferably from 35 to 45% by weight.

The saturated component comprised adequately by the stock oil composition is effective for orienting crystals in a uniaxial direction upon solidification of a mesophase in the production procedure of coke. The saturated component of less than 30% by weight is not Preferred because the mesophase cannot be oriented sufficiently in a uniaxial direction and the texture becomes random. The saturated component of more than 50% by weight, on the other hand, generates too much gas, which tends to act to disturb the orientation of a bulk mesophase. In this case, planes of the carbon layers are not arranged well also in the carbonization and/or graphitization procedure, making it impossible to incorporate many lithium ions at the time of charging. This leads to a decrease in the charge capacity. Such excessive contents are therefore not preferred.

According to the invention, the stock oil composition has, based on the total content (100% by weight) of a saturated component, an aromatic component, a resin component and an asphaltene component detectable by development of the stock oil composition by using a thin-layer chromatography, the aromatic component of from 50 to 70% by weight, preferably from 45 to 65% by weight.

The above-mentioned range of content is indispensable for formation and growth of good mesophases. The aromatic component of less than 50% by weight extremely decreases the yield of coke obtained from the stock oil composition. The aromatic component of more than 70% by weight, on the other hand, drastically generates a number of mesophases in the matrix during the production procedure of coke. In this case, coalescence of mesophases rather than single growth thereof occurs, which deforms the texture of coke, leading to ill-arranged planes of carbon layers also in the carbonization and graphitization procedures subsequent thereto. Using such a material for a negative electrode is not preferred because it limits the number of lithium ions incorporated in the battery, leading to a reduction in charge capacity.

According to the invention, of a saturated component, an aromatic component, a resin component and an asphaltene component, 100% by weight in total, detectable by development of the raw stock oil composition by using thin-layer chromatography, the content of the resin component and the content of the asphaltene component are not particularly limited insofar as the contents of the saturated component and the aromatic component fall within the above-mentioned ranges, respectively.

The average molecular weight of the stock oil composition is measured by the vapor pressure equilibrium method. The outline of the method is as follows: two thermistors are placed in a saturated vapor of a solvent maintained at a predetermined temperature, and a sample solution is dropped on one of the thermistors and the solvent alone is dropped on the other thermistor. At this time, the sample solution has a lower vapor pressure than that of the solvent alone so that the vapor of the atmosphere around the thermistor is condensed on the sample solution. The latent heat released at this time increases temperature, and this temperature difference is determined as the voltage difference (ΔV) of the thermistor. The molar concentration of the sample in the sample solution is then determined based on a calibration curve of the relationship between molar concentration and voltage difference (ΔV) obtained beforehand by using a reference sample having a known molecular weight. Thus the average molecular weight is calculated. In the invention, cyclohexane is used as the solvent and n-cetane (molecular weight: 226.4) is used as the reference sample.

According to the invention, the average molecular weight of the stock oil composition preferably falls within a range of from 400 to 600. This range is indispensable for appropriate formation and growth of mesophases. When the average molecular weight exceeds 600, mesophases are formed in an early stage in the production procedure of coke. Prior to the growth, coking advances and coke having a small texture called mosaic coke is obtained. Carbon layer planes of such coke do not grow even after carbonization and graphitization, so that highly reactive edge planes show a marked increase. Using such a material for a negative electrode is not preferred because gas is generated due to the reaction between the electrolyte solution and edge planes of carbon. The stock oil composition having an average molecular weight below 400 is, on the other hand, not industrially suited because it reduces the yield of coke.

According to the invention, the stock oil composition uses a bottom oil of residue fluid catalytic cracking (RFCC) apparatus for petroleum-derived heavy oil. Residual oil treatment by using fluid catalytic cracking (FCC) itself has been considered unsuited because of deterioration in catalyst or difficulty in controlling the operation temperature. However, according to the invention, the bottom oil of residue fluid catalytic cracking (RFCC) apparatus, which is involved in fluid catalytic cracking (FCC) of a residual oil, can be used preferably.

The residue fluid catalytic cracking (RFCC) apparatus is fluidized-bed fluid catalytic cracking apparatus in which a residual oil (atmospheric residue or the like) is used as a stock oil and selectively causes a cracking reaction by using a catalyst to obtain high-octane FCC gasoline. Examples of the bottom oil of residue fluid catalytic cracking apparatus include bottom oils produced by changing the weight ratio of a catalyst to a residual oil such as atmospheric residue within the range of from 6 to 8 at a reactor outlet temperature (ROT) of from 510 to 540° C.

Accordingly to the invention, the stock oil composition comprises at least the bottom oil of residue fluid catalytic cracking apparatus, but it may further comprises another oil if necessary.

When the bottom oil of residue fluid catalytic cracking apparatus comprises the saturated and aromatic components in the given ranges and has the given average molecular weight, the stock oil composition may contain the bottom oil alone. Alternatively, the bottom oil of residue fluid catalytic cracking apparatus may be used in combination with at least one oil selected from the group consisting of a bottom oil of fluid catalytic cracking (FCC) apparatus, a vacuum residue (VR) of a vacuum distillation unit, a distillate oil of a vacuum distillation unit, a desulfurized and deasphalted oil, and a tar which is an aromatic compound.

The bottom oil of fluid catalytic cracking apparatus is a bottom oil of fluidized-bed apparatus for fluid catalytic cracking in which a vacuum gas oil is used as a stock oil and a cracking reaction selectively takes place by using a catalyst to yield high-octane FCC gasoline. The vacuum residue (VR) of a vacuum distillation unit is a bottom oil of the vacuum distillation unit obtained by treating a crude oil in an atmospheric distillation unit to obtain a gas, light oil, and an atmospheric residue, and then treating the resulting atmospheric residue, for example, at a heating furnace outlet temperature ranging from 320 to 360° C. under reduced pressure of from 10 to 30 Torr. The distillate oil of a vacuum distillation unit is obtained by treating the above-mentioned atmospheric residue at a heating furnace outlet temperature ranging from 320 to 360° C. under reduced pressure of from 10 to 30 Torr. The desulfurized and deasphalted oil is obtained, for example, by treating an oil such as residual oil of vacuum distillation in solvent deasphalting apparatus using, as a solvent, propane, butane, pentane, or a mixture thereof to remove the asphaltene content from the oil and then desulfurizing the resulting deasphalted oil (DAO) to reduce its sulfur content to preferably from 0.05 to 0.40% by weight.

The above-described oil may be optionally blended to produce a stock oil composition satisfying the conditions specified in the invention. For example, after they are optionally blended, a portion of the resulting mixture is sampled and a stock oil composition satisfying the conditions specified in the invention is subjected to the subsequent carbonization step, while a stock oil not satisfying the conditions is adjusted again and only the stock oil satisfying the conditions specified in the invention is provided for the subsequent carbonization step.

According to the invention, the stock oil composition comprises the bottom oil of residue fluid catalytic cracking apparatus in an amount of preferably from 10 to 100% by weight, more preferably from 20 to 90% by weight in the stock oil composition.

It is needless to say that the stock oil composition is preferably free from impurities such as sulfur and metals as much as possible.

The stock oil composition satisfying the specified conditions thus produced is heat-treated (for example, subjected to coking treatment) to obtain a raw material carbon composition. The resulting composition is subjected to pulverization and an optional classification, and then carbonized and/or graphitized to obtain a carbonaceous material for a negative electrode of a lithium-ion secondary battery.

The stock oil composition satisfying the specified conditions is subjected to coking treatment in a conventionally known manner. For example, the stock oil composition is subjected to coking treatment in an autoclave under pressure (for example, 1 MPa) at a temperature of from about 450 to 550° C. for several hours to obtain a raw material carbon composition. According to the invention, the stock oil composition is graphitizable so that in the coking procedure, condensed polycyclic aromatics formed by the thermal cracking reaction are stacked in layers to become raw material carbon comprising graphite-like carbon crystallites. Particularly in the invention, these graphite-like carbon crystallites are preferably comprised by the raw material carbon composition. The graphite-like crystallites mean aggregates of the condensed polycyclic aromatics in hexagonal-network form determined by X-ray diffraction.

The pulverization step of the raw material carbon is carried out in a known manner. The average particle size is preferably 30 μm or less, more preferably from 5 to 30 μm. It is because the commonly and preferably used particle size of a carbonaceous material for a negative electrode of a lithium-ion secondary battery is 30 μm or less. The essential reason why the particle size is specified is that after pulverization and an optional classification of the raw material carbon composition, no pulverization is required until it is carbonized and/or graphitized and used as a carbonaceous material of a negative electrode of a lithium-ion secondary battery. The average particle size is based on the measurement using a laser diffraction particle size distribution analyzer.

The raw material carbon composition is carbonized and/or graphitized to produce a carbonaceous material for a negative electrode of a lithium-ion secondary battery.

The carbonization step is not particularly limited and for example, the raw material carbon composition is calcined at from 1000 to 1500° C. in a rotary kiln, shaft furnace, or the like to obtain calcined coke.

The graphitization step is not particularly limited and, for example, the calcined coke is treated at from 2200 to 2850° C. in an Acheson furnace or the like.

Next, a method of producing a negative electrode of a lithium-ion secondary battery by using a pulverized carbonaceous material, and the lithium-ion secondary battery will be explained.

The method of producing a negative electrode of a lithium-ion secondary battery includes, but not particularly limited to, pressure molding of a mixture comprising the carbonaceous material according to the invention, a binder, an optional conductive aid and an optional organic solvent. Alternatively, a negative electrode of a lithium-ion secondary battery may be produced by kneading the carbonaceous material, a binder, a conductive aid and the like in an organic solvent to obtain a slurry, applying the slurry on a collector, and then drying.

Examples of the binder include polyvinylidene fluoride, polytetrafluoroethylene and SBR (styrene-butadiene rubber). The amount of the binder is adequately from 1 to 30% by weight, preferably from about 3 to 20% by weight, based on 100 by weight of the carbonaceous material.

Examples of the conductive aid include carbon black, graphite, acetylene black, indium-tin oxide exhibiting conductivity, and conductive polymers such as polyaniline, polythiophene and polyphenylenevinylene. The amount of the conductive aid is preferably from 1 to 15% by weight based on 100% by weight of the carbonaceous material.

Examples of the organic solvent include dimethylformamide, N-methylpyrrolidone, isopropanol and toluene.

The carbonaceous material, the binder, an optional conductive aid and an optional organic solvent may be mixed using known apparatus such as a screw-type kneader, a ribbon mixer, a universal mixer, or a planetary mixer. The mixture thus obtained is then formed or molded by rolling or pressing. The pressure upon rolling or pressing is preferably from about 100 to 300 MPa.

The material and shape of the collector are not particularly limited. For example, a collector obtained by forming aluminum, copper, nickel, titanium, stainless steel or the like material into a foil, perforated foil, or mesh in band form may be used. A porous material such as a porous metal (metal foam) or carbon paper may also be used as the collector.

Examples of the method of applying the negative electrode material slurry to the collector include, but not particularly limited to, known methods such as metal mask printing, electrostatic coating, dip coating, spray coating, roll coating, doctor blading, gravure coating, and screen printing. After application, rolling treatment with a flat press, calendar roll or the like is optionally conducted.

Also, integration of the collector with the slurry obtained in the form of a sheet, pellets, or the like may be carried out in a known manner by using, for example, a roll, a press, or a combination thereof.

According to the invention, a lithium-ion secondary battery can be obtained, for example, by placing the negative electrode of the lithium-ion secondary battery formed in the manner described above and a positive electrode so as to face them to each other via a separator, and pouring an electrolyte solution.

An active material to be used for the positive electrode is not particularly limited. For example, a metal compound, metal oxide, metal sulfide or a conductive polymer material capable of doping or intercalating lithium ions may be used. Examples include lithium cobaltate ($LiCoO_2$), lithium nickelate ($LiNiO_2$), lithium manganate ($LiMnO_2$), complex oxides of them ($LiCo_XY_YMn_ZO_Z$ where $X+Y+Z=1$), lithium manganese spinel ($LiMn_2O_4$), lithium vanadium compounds, $V_2O_5$, $V_8O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M:Co, Ni, Mn, Fe), conductive polymers such as polyacetylene, polyaniline, polypyrrole, polythiophene and polyacene, porous carbon and mixtures of these materials.

As the separator, for example, nonwoven fabric, cloth, or microporous film mainly comprising a polyolefin such as polyethylene or polypropylene, and combinations thereof may be used. It is not necessary to use a separator when a positive electrode and a negative electrode are not in direct contact with each other in a lithium-ion secondary battery to be fabricated.

As the electrolyte solution and electrolyte used in the lithium secondary battery, a known organic electrolyte solution, a known inorganic solid electrolyte, or a known polymer solid electrolyte can be used. The organic electrolyte solution is preferable from the viewpoint of electrical conductivity.

Examples of the organic electrolyte solution include an organic solvent, for example, ether such as dibutyl ether, ethylene glycol monomethyl ether, ethylene glycol monoethyl ether, ethylene glycol monobutyl ether, diethylene glycol monomethyl ether and ethylene glycol phenyl ether; amide such as N-methylformamide, N,N-dimethylformamide, N-methylformamide, N,N-diethylformamide, N-methylacetamide, N,N-dimethylacetamide, N-ethylacetamide and N,N-diethylacetamide; a sulfur-containing compound such as dimethyl sulfoxide and sulfolane; dialkyl ketone such as methyl ethyl ketone and methyl isobutyl ketone; cyclic ether such as tetrahydrofuran and 2-methoxytetrahydrofuran; carbonate such as ethylene carbonate, butylene carbonate, diethyl carbonate, dimethyl carbonate, methyl ethyl carbonate, propylene carbonate and vinylene carbonate; γ-butyrolactone; N-methylpyrrolidone; acetonitrile; and nitromethane. Of these, ethylene carbonate, butylene carbonate, diethyl carbonate, dimethyl carbonate, methyl ethyl carbonate, propylene carbonate, vinylene carbonate, γ-butyrolactone, diethoxyethane, dimethyl sulfoxide, acetonitrile, tetrahydrofuran and the like are preferred, with a carbonate-based nonaqueous solvent such as ethylene carbonate and propylene carbonate being particularly preferred. The solvent may be used singly or in combination of two or more solvents.

As a solute (electrolyte) for the solvent, a lithium salt may be used. Examples of the lithium salt include $LiClO_4$, $LiBF_4$, $LiPF_6$, $LiAlCl_4$, $LiSbF_6$, $LiSCN$, $LiCl$, $LiCF_3O_3$, $LiCF_3CO_2$ and $LiN(CF_3SO_2)_2$.

Examples of the polymer solid electrolyte include a polyethylene oxide derivative and a polymer containing the derivative, a polypropylene oxide derivative and a polymers containing the derivative, a phosphoric acid ester polymer, and a polycarbonate derivative and a polymer containing the derivative.

There is absolutely no limitation on the selection of members which are other than those described above but necessary for constituting the battery.

According to the invention, the structure of a lithium-ion secondary battery comprising, as the negative electrode material thereof, the carbonaceous material is not particularly limited. It is usually the common practice to wind a positive electrode, a negative electrode and an optional separator in a flat spiral manner to form a wound polar plate group, or stack them in a flat plate form to form a stacked polar plate group; and then enclose the polar plate group in an outer casing. A lithium-ion secondary battery is used, for example, as a paper cell, a button cell, a coin cell, a stacked cell, a cylindrical cell or the like.

The lithium-ion secondary battery comprising the negative electrode comprising the carbonaceous material according to the invention is superior in high-speed charge and discharge characteristics to a lithium-ion secondary battery comprising the conventional carbonaceous material, and can be used, for example, in an automobile, more specifically, a hybrid vehicle, a plug-in hybrid vehicle, or an electric vehicle.

EXAMPLES

The invention will hereinafter be described based on Examples and Comparative Examples. However, it should not be construed that the invention is limited to or by the following Examples.

Examples 1 to 8 & Comparative Examples 1 to 12

(1) Preparation of a Carbonaceous Material for a Negative Electrode of a Lithium-Ion Secondary Battery Stock oil compositions were prepared by blending various heavy oils. More specifically, the stock oil compositions of Examples 1 to 8 were prepared by blending a bottom oil of residue fluid catalytic cracking apparatus, a bottom oil of fluid catalytic cracking apparatus, and a desulfurized and deasphalted oil as shown in Table 1. The stock oil compositions of Comparative Examples 1 to 12 were prepared by blending a naphtha tar, a petroleum-derived heavy distillate oil, and a Middle Eastern vacuum distillation residual oil. The average molecular weight (MW) of each stock oil composition and the contents of the saturated component and aromatic component determined by thin-layer chromatography are shown in Tables 2 and 3.

TABLE 1

| stock oil composition | RFCC bottom oil | FCC bottom oil | (% by weight: wt %) desulfurized and deasphalted oil |
|---|---|---|---|
| Example 1 | 50 | 0 | 50 |
| Example 2 | 50 | 20 | 30 |
| Example 3 | 50 | 30 | 20 |
| Example 4 | 50 | 40 | 10 |

TABLE 1-continued

| stock oil composition | RFCC bottom oil | FCC bottom oil | (% by weight: wt %) desulfurized and deasphalted oil |
|---|---|---|---|
| Example 5 | 50 | 10 | 40 |
| Example 6 | 50 | 50 | 0 |
| Example 7 | 40 | 60 | 0 |
| Example 8 | 90 | 10 | 0 |

Each of the stock oil compositions was heat-treated in autoclave apparatus under pressure of 0.7 Mpa at 500° C. for 3 hours to obtain raw coke. The raw coke thus obtained was calcined at 1000° C. for one hour into calcined coke (needle coke). The resulting calcined coke was graphitized at 2400° C. for 5 minutes to obtain a carbonaceous material for a negative electrode of a lithium-ion secondary battery.

(2) Evaluation of Charging and Discharging of Negative Electrode Materials (a) Formation of Negative Electrode A slurry was prepared by mixing fine particles of the carbonaceous material for a negative electrode of a lithium-ion secondary battery as an active substance, acetylene black (AB) as a conductive material, and polyvinylidene fluoride (PVDF) as a binder at a weight ratio of 80:10:10 in N-methyl-2-pyrrolidone. The resulting slurry was applied onto a copper foil, dried on a hot plate for 10 minutes, and pressed using a roll press.

(b) Fabrication of a Battery to be Evaluated

A battery was fabricated using the above-mentioned composition (30×50 mm) as a negative electrode, lithium nickelate (30×50 mm) as a positive electrode, a mixed solution of ethylene carbonate (EC) and methyl ethyl carbonate (MEC) having a weight ratio of EC/MEC=3/7 and solute: $LiPF_6$ (1M volume molar concentration) as an electrolyte solution, and a polyethylene microporous film as a separator.

(c) Evaluation of High-Speed Charge and Discharge Rate Characteristics

The measurement results of high-speed charge and discharge characteristics of the batteries thus fabricated are shown in Tables 2 and 3. This evaluation was made at 10 C rate.

The utilization (%) was determined by dividing the charge and discharge capacity at 10 C by the charge and discharge capacity at 1 C.

As shown in Tables 2 and 3, the lithium-ion secondary batteries comprising, as the negative electrodes, the carbonaceous materials prepared from the stock oil compositions obtained in Examples 1 to 9 were superior in both the charge capacity and discharge capacity with good balance under high-speed charge and discharge conditions (10 C) to those comprising, as the negative electrode, the carbonaceous materials prepared from the stock oil compositions obtained in Comparative Examples 1 to 14.

TABLE 2

| | stockoil composition | | | battery performance (10 C) | | | |
|---|---|---|---|---|---|---|---|
| | saturated component (wt %) | aromatic component (wt %) | average molecular weight | charge capacity (mAh) | utilization (%) | discharge capacity (mAh) | utilization (%) |
| Example 1 | 50 | 50 | 585 | 14.7 | 79.5 | 15.1 | 71.4 |
| Example 2 | 44 | 56 | 521 | 15.4 | 81.7 | 15.5 | 82.7 |
| Example 3 | 41 | 59 | 489 | 15.8 | 83.0 | 15.6 | 82.2 |
| Example 4 | 38 | 62 | 457 | 14.9 | 77.1 | 15.2 | 82.0 |
| Example 5 | 47 | 53 | 553 | 15.3 | 82.1 | 15.6 | 81.6 |
| Example 6 | 35 | 65 | 425 | 15.1 | 78.9 | 15.1 | 82.2 |

TABLE 2-continued

| | stockoil composition | | | battery performance (10 C) | | | |
|---|---|---|---|---|---|---|---|
| | saturated component (wt %) | aromatic component (wt %) | average molecular weight | charge capacity (mAh) | utilization (%) | discharge capacity (mAh) | utilization (%) |
| Example 7 | 36 | 64 | 410 | 15.7 | 82.2 | 15.8 | 80.7 |
| Example 8 | 31 | 69 | 485 | 15.3 | 82.4 | 15.5 | 82.6 |

TABLE 3

| | stock oil compostition | | | battery performance (10 C) | | | |
|---|---|---|---|---|---|---|---|
| | saturated component (wt %) | aromatic component (wt %) | Average molecular weight | charge capacity (mAh) | utilization (%) | discharge capacity (mAh) | utilization (%) |
| Comp. Ex. 1 | 35 | 52 | 630 | 12.9 | 75.0 | 12.7 | 75.2 |
| Comp. Ex. 2 | 38 | 47 | 675 | 12.5 | 74.6 | 12.6 | 74.6 |
| Comp. Ex. 3 | 37 | 63 | 280 | 12.8 | 75.1 | 12.8 | 74.6 |
| Comp. Ex. 4 | 34 | 62 | 356 | 12.7 | 74.4 | 12.9 | 75.1 |
| Comp. Ex. 5 | 26 | 70 | 330 | 12.5 | 74.1 | 12.6 | 74.4 |
| Comp. Ex. 6 | 45 | 39 | 715 | 12.1 | 73.5 | 12.2 | 60.1 |
| Comp. Ex. 7 | 55 | 31 | 700 | 8.8 | 56.6 | 9.1 | 58.9 |
| Comp. Ex. 8 | 24 | 73 | 350 | 11.0 | 71.4 | 11.5 | 70.7 |
| Comp. Ex. 9 | 29 | 70 | 299 | 12.5 | 74.3 | 12.3 | 73.7 |
| Comp. Ex.10 | 51 | 46 | 423 | 11.7 | 63.4 | 11.9 | 62.9 |
| Comp. Ex. 11 | 59 | 30 | 625 | 8.9 | 50.1 | 9.1 | 58.6 |
| Comp. Ex.12 | 46 | 33 | 850 | 7.4 | 49.5 | 7.7 | 50.2 |
| Comp. Ex.13 | 28 | 54 | 885 | 8.5 | 52.5 | 9.1 | 60.6 |
| Comp. Ex.14 | 21 | 67 | 520 | 8.7 | 51.6 | 7.9 | 58.4 |

What is claimed is:

1. A stock oil composition for a carbonaceous material for a negative electrode of a lithium-ion secondary battery, the composition comprising
a residue fluid catalytic cracking apparatus bottom oil as a raw material,
wherein the composition comprises a saturated component, an aromatic component, a resin component, and an asphaltene component detectable by development of the composition by using thin-layer chromatography, the saturated component ranging from 30 to 50% by weight and the aromatic component ranging from 50 to 70% by weight; and has an average molecular weight ranging from 400 to 600.

2. A raw material carbon composition for a carbonaceous material for a negative electrode of a lithium-ion secondary battery, the raw material carbon composition being obtained by heat-treating the stock oil composition as claimed in claim 1.

3. The raw material carbon composition according to claim 2, comprising a graphite-like carbon crystallite.

4. A method of preparing a carbonaceous material for a negative electrode of a lithium-ion secondary battery comprising at least the steps of:
pulverizing the raw material carbon composition as claimed in claim 2 or 3 into a raw material carbon composition powder having an average particle size of 30 μm or less; and
carbonizing and/or graphitizing the raw material carbon composition powder.

5. A lithium-ion secondary battery comprising a negative electrode material comprising the carbonaceous material obtained by the method as claimed in claim 4.

* * * * *

UNITED STATES PATENT AND TRADEMARK OFFICE
CERTIFICATE OF CORRECTION

PATENT NO. : 8,784,644 B2  
APPLICATION NO. : 13/727815  
DATED : July 22, 2014  
INVENTOR(S) : Tamotsu Tano et al.

Page 1 of 1

It is certified that error appears in the above-identified patent and that said Letters Patent is hereby corrected as shown below:

On the Title Page, item (71), "Applicants: Tamotsu Tano, Yamaguchi (KH);  
        Takashi Oyama, Yamaguchi (JP); Hiroshi Ozawa, Yamaguchi (JP); Jun  
        Ougiya, Yamaguchi (JP); Akio Sakamoto, Tokyo (JP)"  
    should read --Applicant: JX NIPPON OIL & ENERGY CORPORATION,  
        Tokyo (JP)--.

On the Title Page, Item (72) in the Inventors, "Tamotsu Tano, Yamaguchi  
        (KH)" should read --Tamotsu Tano, Yamaguchi (JP)--.

Signed and Sealed this  
Ninth Day of June, 2015

Michelle K. Lee  
*Director of the United States Patent and Trademark Office*